US010458691B2

(12) United States Patent
Qu et al.

(10) Patent No.: US 10,458,691 B2
(45) Date of Patent: *Oct. 29, 2019

(54) CONTROLLING AIR CONDITIONER MODES (71) Applicant: Lennox Industries Inc., Richardson, TX (US)

(72) Inventors: Yi Qu, Coppell, TX (US); Pete Hrejsa, Frisco, TX (US); Eric Berg, The Colony, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,450

(22) Filed: Oct. 27, 2017

(65) Prior Publication Data

US 2018/0051923 A1 Feb. 22, 2018

Related U.S. Application Data (63) Continuation of application No. 13/714,094, filed on Dec. 13, 2012, now Pat. No. 9,810,467.

(51) Int. Cl.
*F25B 49/02* (2006.01)
*F25B 13/00* (2006.01)

(52) U.S. Cl.
CPC ............ *F25B 49/022* (2013.01); *F25B 49/02* (2013.01); *F25B 13/00* (2013.01); *F25B 2600/0253* (2013.01); *F25B 2600/112* (2013.01); *Y02B 30/741* (2013.01); *Y02B 30/743* (2013.01)

(58) Field of Classification Search
CPC .............. F25B 49/02; F25B 2600/0253; F25B 2600/112; F25B 49/022; Y02B 30/741; Y02B 30/743
See application file for complete search history.

(56) References Cited

U.S. PATENT DOCUMENTS

| 4,744,223 | A | * | 5/1988 | Umezu | G05D 23/1917 62/176.5 |
|---|---|---|---|---|---|
| 5,385,030 | A | | 1/1995 | Kitagawa et al. | |
| 5,483,805 | A | | 1/1996 | Fujii | |
| 5,613,369 | A | | 3/1997 | Sato | |
| 5,660,226 | A | | 9/1997 | Kurahashi | |
| 5,971,845 | A | | 10/1999 | Echigoya | |
| 8,011,199 | B1 | | 9/2011 | Chen | |
| 2002/0170305 | A1 | | 11/2002 | Nakajima | |
| 2002/0175305 | A1 | | 11/2002 | McCabe et al. | |
| 2006/0230334 | A1 | | 10/2006 | Slawson et al. | |
| 2006/0260334 | A1 | | 11/2006 | Carey | |

(Continued)

FOREIGN PATENT DOCUMENTS

| JP | 60001011 | | 1/1985 | |
|---|---|---|---|---|
| JP | 60001011 | A * | 1/1985 | ......... B60H 1/00971 |

(Continued)

*Primary Examiner* — Kun Kai Ma
(74) *Attorney, Agent, or Firm* — Baker Botts L.L.P.

(57) ABSTRACT

In various implementations, a request for operation of an air conditioner may be received. The air conditioner may include a cooling mode and/or a dehumidifying mode. In some implementations, a compressor speed for a compressor of the air conditioner may be determined, and which mode(s) of the air conditioner to allow may be determined based at least partially on the determined compressor speed.

11 Claims, 3 Drawing Sheets (56) References Cited

U.S. PATENT DOCUMENTS

| | | |
|---|---|---|
| 2009/0007577 A1 | 1/2009 | Kotani |
| 2009/0230202 A1 | 9/2009 | Matsui et al. |
| 2013/0139536 A1 | 6/2013 | Jeong |
| 2014/0165612 A1 | 6/2014 | Qu et al. |
| 2014/0343733 A1 | 11/2014 | Turner |

FOREIGN PATENT DOCUMENTS

| | | | |
|---|---|---|---|
| JP | 07248141 | | 9/1995 |
| JP | 07248141 A | * | 9/1995 |

* cited by examiner

CONTROLLING AIR CONDITIONER MODES

CROSS REFERENCE TO RELATED INFORMATION

This application is a continuation, of U.S. patent application Ser. No. 13/714,094, filed Dec. 13, 2012, titled Controlling Air Conditioner Modes, now U.S. Pat. No. 9,810,467 the contents of which are hereby incorporated herein in its entirety.

TECHNICAL FIELD

The present disclosure relates to controlling air conditioner modes.

BACKGROUND OF THE INVENTION

Air conditioners, including air conditioners with heat pump operations, may provide cool and/or warm air to a location. The air conditioner may also dehumidify the air when a user selects a humidity control option.

BRIEF SUMMARY OF THE INVENTION

In various implementations, a method for controlling an air conditioner may include receiving a request for operation of an air conditioner, which includes at least two modes. At least two of the modes of the air conditioner may include a cooling mode and a dehumidifying mode. A compressor speed for a compressor of the air conditioner may be determined, and a determination of which one or more of the modes of the air conditioner to allow may be made based at least partially on the determined compressor speed. Determining which one or more of the modes to allow may include allowing the cooling mode if the compressor speed is greater than a predetermined first speed; allowing the cooling mode and the dehumidifying mode if the compressor speed is less than the predetermined first speed and if the compressor speed is greater than a predetermined second speed; allowing the dehumidifying mode if the compressor speed is less than the predetermined second speed and a relative humidity is greater than a predetermined high relative humidity value; and/or allowing the cooling mode if the compressor speed is less than the predetermined second speed and a relative humidity is less than or equal to the predetermined high relative humidity value.

Implementations may include one or more of the following features. The air conditioner may be allowed to operate based at least partially on the one or more modes of the air conditioner determined to be allowed. In some implementations, the request for operation may include a set point temperature and the compressor speed may be less than the predetermined second speed. The set point temperature may be reduced if an overcool mode selection has been received. Reducing the set point temperature may include reducing the set point temperature by approximately two degrees Fahrenheit. A request for operation may include a set point temperature, and the predetermined high relative humidity value may be approximately 60% relative humidity. In some implementations, a relative humidity proximate an air conditioner may be determined. The predetermined first speed may be approximately 90 percent of a maximum compressor speed, and the predetermined second speed may include a minimum compressor speed. In some implementations, the request for operation may include a set point. The set point may include a set point temperature and/or a set point relative humidity. A temperature and/or a relative humidity proximate the air conditioner may be monitored, and determining a compressor speed for the compressor may include selecting a compressor speed to reduce the monitored temperature and/or the monitored relative humidity to the set point of the received request for operation.

In various implementations, a request for operation of an air conditioner, which includes at least two modes, may be received. At least two of the modes of the air conditioner may include a cooling mode and a dehumidifying mode. A compressor speed for a compressor of the air conditioner may be determined, and a determination of which of the one or more modes of the air conditioner to allow may be made based at least partially on the determined compressor speed.

Implementations may include one or more of the following features. Determining which one or more of the modes to allow may include allowing the cooling mode if the compressor speed is greater than a predetermined first speed. Determining which one or more of the modes to allow may include allowing the cooling mode and the dehumidifying mode if the compressor speed is less than a predetermined first speed and if the compressor speed is greater than a predetermined second speed. Determining which one or more of the modes to allow may include allowing the dehumidifying mode if the compressor speed is less than a predetermined second speed and a relative humidity proximate the air conditioner is greater than a predetermined high relative humidity value. In some implementations, determining which one or more of the modes to allow may include allowing the cooling mode if the compressor speed is less than a predetermined second speed and a relative humidity is less than or equal to a predetermined high relative humidity value.

In various implementations, an air conditioner may include a compressor that includes at least two speeds, an evaporator fan, and a controller. The controller may include module(s), such as a priority module. The priority module may determine a compressor speed for a compressor of the air conditioner, and determine which one or more operating modes of the air conditioner to allow based at least partially on the determined compressor speed. The air conditioner may include at least two operating modes, which may include a cooling mode and a dehumidifying mode.

Implementations may include one or more of the following features. The priority module may allow the cooling mode if the compressor speed is greater than a predetermined first speed. The priority module may allow the cooling mode and the dehumidifying mode if the compressor speed is less than a predetermined first speed and if the compressor speed is greater than a predetermined second speed. The priority module may allow the dehumidifying mode if the compressor speed is less than a predetermined second speed and a relative humidity is greater than a predetermined high relative humidity value. The priority module may allow the cooling mode if the compressor speed is less than a predetermined second speed and a relative humidity is less than or equal to a predetermined high relative humidity value. In some implementations, the priority module may allow the air conditioner to operate based at least partially on at least one of the modes to be allowed. In some implementations, the priority module may receive a request for an overcool mode, receive a request for operation comprising a set point temperature, and reduce the set point temperature by a predetermined value. The priority module may receive a request for an overcool mode, receive a request for operation comprising a set point temperature, and inhibit reduction of the set point temperature by a predetermined value if the cooling mode is allowed.

The details of one or more implementations are set forth in the accompanying drawings and the description below. Other features, objects, and advantages of the implementations will be apparent from the description and drawings.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION OF THE INVENTION

Figure 1:
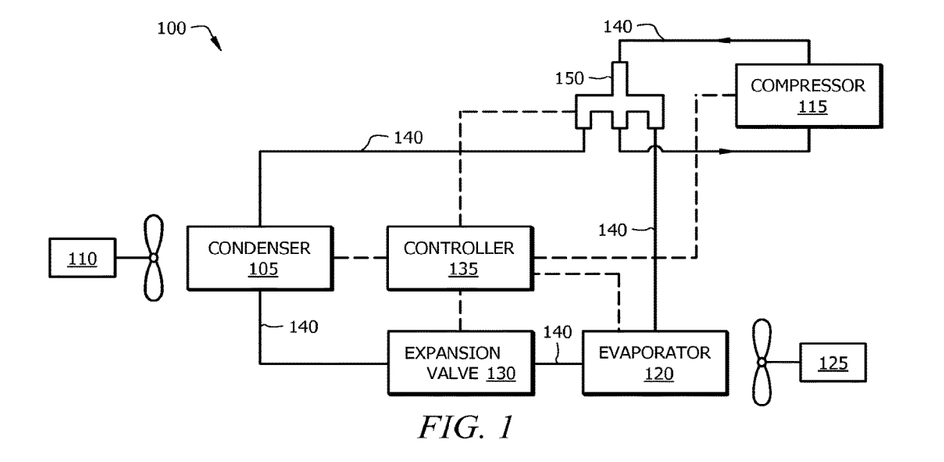
FIG. 1 illustrates an implementation of an example air conditioner.

FIG. 1 illustrates an implementation of an example air conditioner 100. The air conditioner 100 may provide cool air to a location (e.g., a building, a house, and/or a room). The air conditioner 100 may include a condenser 105, a condenser fan 110, a compressor 115, an evaporator 120, an evaporator fan 125, an expansion valve 130 and a controller 135. The air conditioner 100 may further include lines 140 (e.g. tubing) through which refrigerant flows. The lines 140 may couple the condenser 105, compressor 115, evaporator 120 and expansion valve 130 together into a refrigerant circuit. In some implementations, the air conditioner 100 may include a heat pump operation and may include a reversing valve 150 to reverse the flow of refrigerant in the lines 140 and thereby allow the option to provide either heating or cooling to a location.

The condenser 105 and the evaporator 120 may be any appropriate type of heat exchanger(s). The condenser fan 110 and the evaporator fan 125 may provide air flow to the condenser 105 and the evaporator 120, respectively. Any appropriate fan, such as a mechanical axial flow fan, may be used.

During a cooling cycle, cool air may be provided by the air conditioner 100 by allowing air from the evaporator fan 125 to flow across the evaporator 120 (e.g., indoor unit) that evaporates liquid refrigerant. A temperature of the air may be reduced and the cool air may be provided to a location (e.g., via ducting). The gaseous refrigerant may exit the evaporator 120, travel through the lines 140 of the air conditioner 100, be compressed by the compressor 115, and then delivered to the condenser 105 (e.g., outdoor unit). The condenser 105 may condense the gaseous refrigerant, for example by allowing air from the condenser fan 110 to flow through the condenser 105, thereby removing heat from the gaseous refrigerant. The condensed refrigerant may be provided to the evaporator 120 through the expansion valve 130. In some implementations, the expansion valve 130 may regulate the amount of refrigerant allowed to enter the evaporator 120.

In some implementations, the air conditioner 100 may include a heat pump operation and a reversing valve 150. Heat pump operations in the air conditioner may allow operations with heating and cooling cycles. To allow the heat pump air conditioner to operate in a heating cycle, the reversing valve 150 may be reversed to allow the refrigerant to flow through lines 140 in the opposite direction as the cooling cycle. For example, hot air may be provided by blowing air across the indoor unit, which acts as a condenser (e.g., the air may remove heat from the refrigerant and allow the refrigerant to condense). The hot air may be provided to a location by the air conditioning system. During the heating cycle, the outdoor unit may act as an evaporator and the temperature of the air may be cooler leaving the outdoor unit than when entering the outdoor unit.

The air conditioner 100 may further include a controller 135. The controller 135 may be a computer and include a memory and a processor. The processor may execute instructions and manipulate data to perform operations of the controller 135. The processor may include a programmable logic device, a microprocessor, or any other appropriate device for manipulating information in a logical manner, and the memory may include any appropriate form(s) of volatile and/or nonvolatile memory, such as RAM and/or Flash memory.

The memory may store data such as predetermined values (e.g., first speed for a condenser, second speed for a condenser, preset set points, high humidity values, and/or other values); ranges for system properties, such as temperatures, times, and/or relative humidity; operation parameters, such as condenser speeds and/or fan speeds to achieve a set point temperature and/or relative humidity; and/or other data.

Various software modules may be stored on the memory and be executable by the processor of the controller 135. For example, instructions, such as operating systems and/or modules such as management modules and/or priority modules may be stored on the memory. The management modules may manage operations and/or components (e.g., heat exchangers, valves, lines, fans, and/or compressors) of the air conditioner such as responding to requests, determining operating parameters of various components of the air conditioner, and/or operating a reversing valve of a heat pump air conditioner (e.g., air conditioner with a heat pump operation). The priority modules may prioritize module operations, determine and/or select modules for operation, prioritize modules to allow, receive and/or process requests for air conditioner operations, determine components operating parameters (e.g., speeds of component operations), compare compressor speeds to various predetermined values to determine which mode to allow, receive input from users (e.g., to prioritize defrost, to allow overcool mode, and/or to restrict overcool mode), etc. In various implementations, the modules may include various modules and/or sub-modules. In some implementations, the modules may perform one or more of the operations described in process 200 and/or 300, illustrated in FIGS. 2 and 3.

The controller 135, illustrated in FIG. 1, may include a communication interface that may allow the controller 135 to communicate with components of the air conditioner 100, other repositories, and/or other computer systems. The communication interface may transmit data from the controller 135 and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the air conditioner 100 may be stored in a memory and may be updated and/or altered through the communication via network protocols (e.g., remotely through a firmware update and/or by a device directly coupled to the controller 135).

The controller 135 may include a presentation interface (e.g., a portion of the thermostat) to present data to a user, such as though a monitor and speakers. The presentation interface may facilitate receipt of requests for operation from users.

In various implementations, air conditioners (e.g., air conditioner with heat pump operations and/or air conditioners capable of providing cool air) may have modes of operations. The controller 135 may determine which mode(s) to allow and/or the priority in which to allow the mode(s). For example, the controller 135 may prioritize cooling demand over dehumidifying. A user may feel more comfortable in a location with a temperature closer to a desired set point and a higher relative humidity than in a location with a relative humidity closer to a desired set point and a temperature not close to the set point.

The modes of air conditioner operation may include a cooling mode that provides cool air to reduce a temperature of a location and/or a dehumidifying mode that removes moisture from the air and reduces the relative humidity of a location. The cooling mode and the dehumidifying mode may run separately and/or simultaneously, as described in U.S. patent application Ser. No. 13/333,658, entitled "Control System and Method for Both Energy Saving and Comfort Control in Air Conditioning System" to Qu et al. filed Dec. 21, 2011, which is hereby incorporated by reference as if fully set forth herein.

In some implementations, the cooling mode may include operating a compressor of the air conditioner at a speed between a minimum compressor speed (e.g., a low speed of a two speed compressor and/or a lowest speed of a multispeed compressor) and approximately 100% (e.g., full speed, a high speed of a two speed compressor and/or a highest speed of a multispeed compressor). During the cooling mode, the evaporator fan (e.g., fan associated with the indoor unit) may operate at the maximum speed associated with the selected compressor speed. For example, if a compressor is allowed to operate at 100% of a maximum speed, then the evaporator fan may be allowed to operate at a maximum speed (e.g., 1200 CFM); and if the compressor is allowed to operate at 50% (e.g., 50% of a maximum speed), then the evaporator fan may be allowed to operate at 600 CFM (e.g., the maximum fan speed associated with the compressor speed at 50%).

In some implementations, the dehumidifying mode may include operating a compressor at approximately 100% (e.g., full speed, a high speed of a two speed compressor and/or a highest speed of a multispeed compressor). During the dehumidifying mode, the evaporator fan (e.g., fan associated with the indoor unit) may be set at the minimum speed associated with the compressor speed (e.g., the minimum speed at which the fan may run without the coil freezing and/or greater than zero).

In some implementations, the air conditioner may be allowed to run in a combination cooling mode and dehumidifying mode. The determined compressor speed may be between a minimum compressor speed (e.g., a low speed of a two speed compressor and/or a lowest speed of a multispeed compressor) and approximately a maximum compressor speed (e.g., full speed, a high speed of a two speed compressor and/or a highest speed of a multispeed compressor). During the combination cooling mode and dehumidifying mode, the evaporator fan (e.g., fan associated with the indoor unit) may be allowed to run at a speed between a minimum speed (e.g., a minimum speed at which the fan may run without the coil freezing and/or greater than zero) and a maximum speed.

In some implementations, the controller may at least partially utilize Proportional and Integral (PI) control algorithms and/or Proportional, Integral and Derivative (PID) control algorithms to select operation parameters, such as compressor speed and evaporator fan speed. The controller may include a PI controller and/or PID controller.

Figure 2:
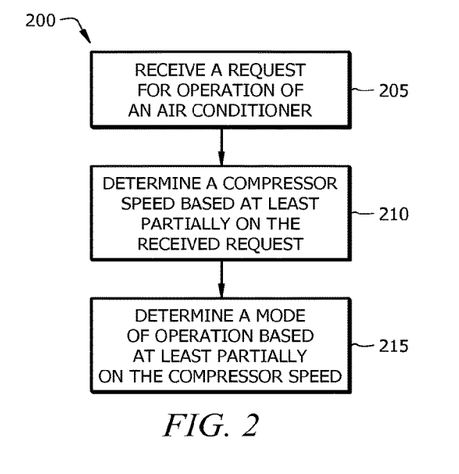
FIG. 2 illustrates an implementation of an example process for controlling air conditioner modes.

FIG. 2 illustrates an implementation of an example process 200 for controlling air conditioner modes. A request for operation of an air conditioner may be received (operation 205). A user may request operation of the air conditioner to achieve a set point temperature and/or a set point relative humidity in a location. For example, the user may select a temperature and/or a relative humidity as set point(s) using a controller (e.g., a thermostat) and the selected set point(s) may be transmitted with the request for operation.

The air conditioner may then determine appropriate settings for various components of the air conditioner. For example, a compressor speed may be determined at least partially based on the received request (operation 210). The controller may utilize PI control algorithms to determine a compressor speed that will allow an air conditioner to satisfy a requested set point temperature (e.g., a compressor speed that will allow a temperature proximate the air conditioner to be measured at a temperature approximately equal to the set point temperature).

A mode of operation of the air conditioner may be determined based at least partially on the compressor speed (operation 215). For example, the air conditioner (e.g., module of the controller) may compare the set point temperature to a monitored temperature proximate the air conditioner. The air conditioner (e.g., controller) may determine which mode(s) to select based at least partially on cooling demand.

For example, if the cooling demand is in a predetermined first range (e.g., predetermined cooling range where cooling demand is greater than approximately 90% and/or compressor speed is greater than approximately 90% of full speed), then the cooling mode may be allowed. The controller may allow temperature control to be prioritized over dehumidifying set points when the cooling demand is high, in some implementations.

If the cooling demand is in a predetermined second range (e.g., cooling demand is between a minimum demand and 90% of compressor maximum speed, cooling demand is less than the predetermined cooling range and greater than a predetermined minimum cooling demand, and/or a compressor speed is greater than a minimum compressor speed and less than approximately 90% of full speed), then the cooling mode and the dehumidifying mode may be allowed. For example, the cooling mode and the dehumidifying mode may be allowed together as described in U.S. patent application Ser. No. 13/333,658.

When the cooling demand is in a predetermined third range (e.g., cooling demand is less than a predetermined minimum cooling demand and/or the compressor speed is less than a minimum compressor speed), the controller may determine the mode based at least partially on a determined relative humidity proximate the air conditioner. The temperature and/or relative humidity may be measured by sensors and utilized by the controller, in some implementations. When the relative humidity is greater than a predetermined high humidity value (e.g., greater than approximately 60% relative humidity and/or greater than a set point humidity), then the controller may allow the dehumidifying mode. When the relative humidity is less than a predetermined value (e.g., the high humidity value, the set point humidity in the request from the user, and/or less than or equal to approximately 60% relative humidity), then the controller may allow the cooling mode. Otherwise, if the cooling demand is low (e.g., when the temperature measured proximate the air conditioner is approximately equal to the set point temperature), the dehumidifying mode may be allowed to operate until it is approximately equal to the set point relative humidity.

Process 200 may be implemented by various systems, such as system 100. In addition, various operations may be added, deleted, and/or modified. For example, temperature and/or relative humidity proximate the air conditioner may be monitored and utilized to determine a compressor speed. In some implementations, an air conditioner may include more than two modes of operation. In some implementations, an air conditioner may run modes separately and/or in combination. The air conditioner may monitor other properties, such as pressure. In some implementations, the compressor may be restricted from operating at speeds less than a predetermined minimum compressor speed.

In some implementations, the set point humidity may be preset into the air conditioner system (e.g., saved in a memory of the controller). The user may request to activate the dehumidifying mode, and the air conditioner may retrieve the preset set point and control the air conditioner operations based on the preset set point for relative humidity.

Figure 3:
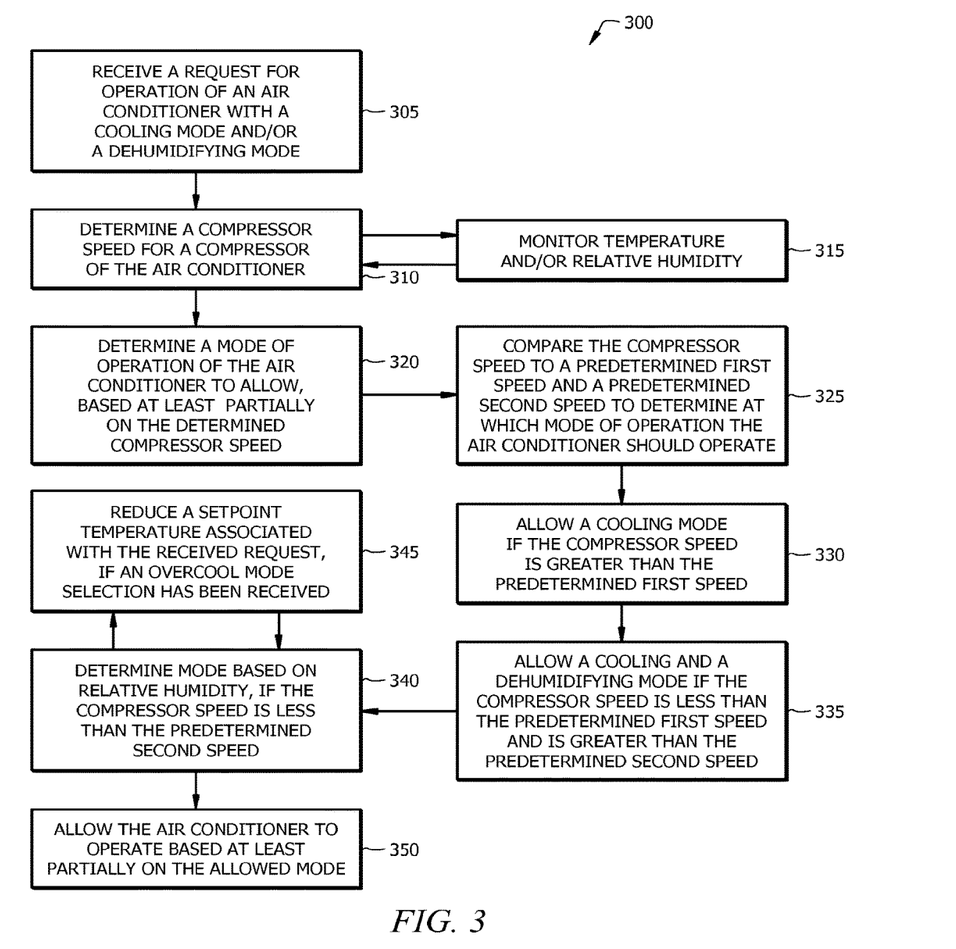
FIG. 3 illustrates an implementation of an example process for controlling air conditioner modes.

FIG. 3 illustrates an implementation of an example process 300 for controlling air conditioner modes. A request for operation of an air conditioner with a cooling mode and/or a dehumidifying mode may be received (operation 305). A user may select a set point temperature and/or a set point relative humidity on a controller (e.g., thermostat). The controller may receive the user selections in the request for operation of the air conditioner.

A compressor speed for a compressor of the air conditioner may be determined (operation 310). The compressor speed may be determined by the controller based on PI control algorithms. For example, a temperature and/or a relative humidity may be monitored (operation 315). The monitored properties (e.g., temperature and/or relative humidity) may be utilized by the controller to determine a compressor speed that may allow the air conditioner to reduce the monitored property(ies) to be approximately equal to the set point(s) in the request. In some implementations, the controller (e.g., a module of the controller) may determine the operating instructions for other components of the air conditioner. For example, the operating speed for the evaporator fan may be determined based at least partially on the determined compressor speed.

A mode of operation of the air conditioner may be determined and allowed, based at least partially on the determined compressor speed (operation 320). For example, the cooling demand and/or compressor speed may be compared to a predetermined range of values to determine which mode(s) of operation the air conditioner may be allowed and/or determine which mode(s) of operation of the air conditioner may be restricted. In some implementations, the controller may determine which mode to allow further based on the monitored properties, such as temperature and/or relative humidity.

The compressor speed may be compared to a predetermined first speed and a predetermined second speed to determine in which mode(s) of operation the air conditioner should operate (operation 325). For example, the predetermined first speed and the predetermined second speed may be stored in a memory of the air conditioner, and the controller may retrieve the values and compare the values to the compressor speed.

A cooling mode may be allowed if the determined compressor speed is greater than the predetermined first speed (operation 330). During the cooling mode, the compressor speed may be in the range between a minimum operating speed and a full operating speed and the evaporator fan speed may be determined based at least partially on the compressor speed. In some implementations, the evaporator fan speed may be the full speed (e.g., approximately 100%) of the evaporator fan speed associated with the compressor speed. For example, various evaporator fan speeds may be correlated to various compressor speeds (e.g., based on manufacturer look up tables, based on inhibiting freezing proximate evaporator coils, and/or based on optimized performance).

A cooling mode and a dehumidifying mode may be allowed if the determined compressor speed is less than the predetermined first speed and is greater than the predetermined second speed (operation 335). For example, the compressor speed may be allowed between a minimum and a maximum speed based on a proportional and integral control algorithm to control temperature. The evaporator fan speed may be allowed between a minimum and a maximum speed based on a proportional and integral control algorithm to control relative humidity.

If the determined compressor speed is less than the predetermined second speed, the mode selected may be based at least partially on the monitored relative humidity (operation 340). For example, if the relative humidity is greater than a predetermined high humidity value (e.g., approximately 60% relative humidity), then a dehumidifying mode may be allowed. If the relative humidity is less than or equal to the predetermined high humidity value, then the cooling mode may be allowed. Thus, when the cooling demand is low, the dehumidifying mode may be prioritized over cooling.

A set point temperature associated with the received request may be reduced, if an overcool mode selection has been received (operation 345). In some implementations, a user may select an overcool mode. The overcool mode may reduce a set point temperature by a predetermined value (e.g., two degrees Fahrenheit) during the dehumidifying operation. The overcool mode may be restricted, in some implementations, to operations when the controller allows the dehumidifying mode.

The air conditioner may be allowed to operate based at least partially on the allowed mode (operation 350). For example, the air conditioner may determine operating parameters for other components and allow cool and/or dehumidified air to be delivered to a location.

Process 300 may be implemented by various systems, such as system 100. In addition, various operations may be added, deleted, and/or modified. In some implementations, process 300 may be performed in combination with other processes and/or operations of processes, such as process 200. For example, the overcooling mode may be restricted when the cooling mode is selected. In some implementations, the compressor may be restricted from operating at speeds below a minimum operating speed. In some implementations, the evaporator fan speed may be determined based at least partially on the compressor speed and/or the mode selected.

In some implementations, the user may be restricted from inputting a set point humidity. In some implementations, the air conditioner may include a preset set point humidity. A user may request a dehumidifying mode, and the controller may retrieve the preset set point for humidity and utilize the preset set point for further operations. In some implementations, a user may provide a request that the dehumidifying mode takes priority when requested. The controller may allow the dehumidifying mode priority over the cooling mode operation when the request for dehumidifying priority is received. In some implementations, the controller may allow the cooling mode when the cooling demand is greater than approximately 90% and/or when the compressor speed is greater than approximately 90%

Example 1

Figure 4:
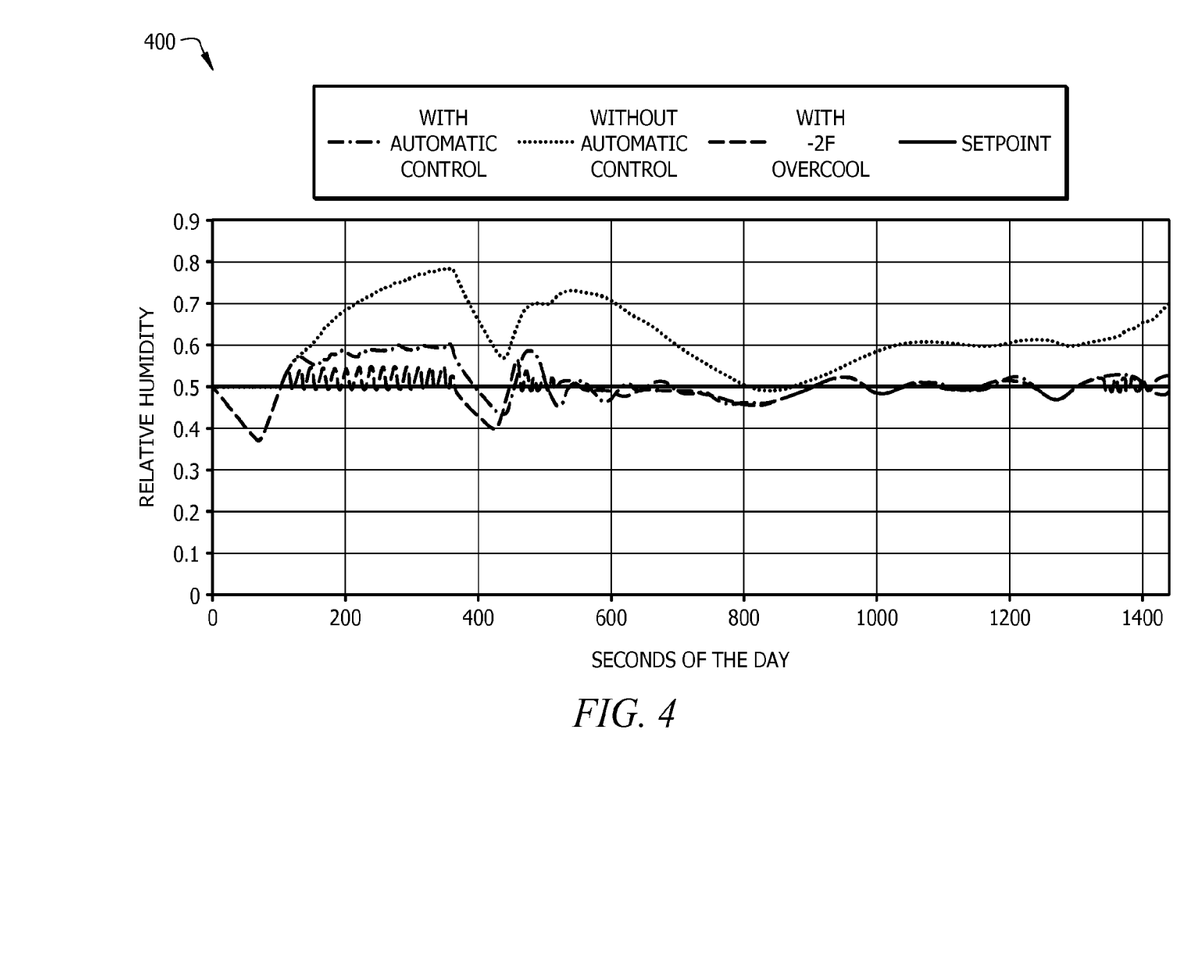
FIG. 4 illustrates an example graph of measured relative humidity during operations of implementations of air conditioners.

As illustrated in FIG. 4, four air conditioner modes were operated to test the ability to achieve a set point relative humidity of 0.5 (e.g. 50% relative humidity). In air conditioner A, the air conditioner was allowed to operate with automatic control similar to the process described in process 300. In air conditioner A, the overcool option was not requested. In air conditioner B, the air conditioner was allowed to operate without automatic control and a dehumidifying operation was allowed where the compressor was run at full speed and the evaporator fan was run at a minimum speed. In air conditioner C, the air conditioner was allowed to operate with an overcool option of −2 degrees Fahrenheit selected.

The air conditioners A, B, C were allowed to operate and the relative humidity proximate each air conditioner (e.g., proximate a thermostat of an air conditioner) and time of operation were monitored. As illustrated, air conditioners A and C were able to better achieve a set point humidity and more quickly able to achieve the set point humidity.

End of Example 1

Although FIG. 1 describes an implementation of an air conditioner, other implementations may be utilized as appropriate. For example, the air conditioner may be disposed inside a building. In some implementations, the air conditioner may include a metering device, such as an expansion valve. The air conditioner may include heat pump operations.

Although a specific controller has been described in FIG. 1, the controller may be any appropriate computer or other programmable logic device. The controller may include a processor that executes instructions and manipulates data to perform operations of the controller. Processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as predetermined property values (e.g., temperature and/or relative humidity); predetermined speeds (e.g., first speed and/or second speed); preset set points; predetermined ranges; and/or any other data useful to the operation of the air conditioner and/or modules of the air conditioner.

In addition, various software may be stored on the memory. For example, instructions (e.g., operating systems and/or other types of software), and modules such as priority modules and/or management modules may be stored on the memory. The management modules may operate the air conditioner during normal operations (e.g., operations in which the air conditioner operates based at least partially on user requests for operation). For example, the management modules may receive requests for operation from a user and operate the air conditioner to satisfy the user request. The priority modules may receive requests for operation, determine compressor speeds, monitor properties (e.g., temperature and/or relative humidity), determine modes of operation, compare compressor speeds to various predetermined values to determine which mode of operation to allow, reduce set points, allow overcool modes, alter priorities of modes, etc. The modules may have overlapping and/or similar operations and/or may share data based on operations for further operations.

In some implementations, modules may be combined, such as into a single module or multiple modules. Management modules and priority modules may be distinct modules. In an implementation, management modules and/or priority modules may include various modules and/or submodules.

The controller may include a presentation interface to present data to a user, such as though a monitor and speakers. The presentation interface may facilitate receipt of requests for operation from users.

A client (e.g., control panel in field or building) may allow a user to access the controller and/or instructions stored on the controller. The client may be a computer system such as a personal computer, a laptop, a personal digital assistant, a smart phone, or any computer system appropriate for communicating with the controller. For example, a technician may utilize a client, such as a tablet computer, to access the controller. As another example, a user may utilize a client, such as a smart phone, to access the controller and request operations.

Although FIG. 1 provides one example of controller that may be used with the disclosure, controller can be implemented through computers such as servers, as well as a server pool. For example, controller may include a general-purpose personal computer (PC) a Macintosh, a workstation, a UNIX-based computer, a server computer, or any other suitable device. According to one implementation, controller may include a web server. Controller may be adapted to execute any operating system including UNIX, Linux, Windows, or any other suitable operating system. The controller may include software and/or hardware in any combination suitable to provide access to data and/or translate data to an appropriate compatible format.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although users have been described as a human, a user may be a person, a group of people, a person or persons interacting with one or more computers, and/or a computer system.

Various described patents have been incorporated by reference. The described patents are incorporated by reference to the extent that no conflict exists between the various described systems and/or processes and the described patents. Any portion, of the described patents that are incorporated by reference, that is conflicting with the various described systems and/or processes are not incorporated by reference.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a cooling mode" includes a combination of two or more cooling modes and/or operations; and, reference to "a dehumidifying mode" includes different types and/or combinations of dehumidifying modes and/or operations. Reference to "a compressor" may include a combination of two or more compressors. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of controlling an air conditioner, the method comprising:
    receiving a request for operation of the air conditioner;
    determining a compressor speed for a compressor of the air conditioner; and
    determining, based on the determined compressor speed, a mode of the air conditioner to allow, wherein determining a mode to allow comprises:
        allowing a cooling mode if the determined compressor speed is greater than a predetermined first speed;
        allowing the cooling mode and a dehumidifying mode if the determined compressor speed is less than the predetermined first speed and if the determined compressor speed is greater than a predetermined second speed; and
        allowing only the dehumidifying mode if the determined compressor speed is less than the predetermined second speed and a relative humidity is greater than a predetermined relative humidity value.

2. The method of claim 1 further comprising:
    monitoring temperature or relative humidity proximate the air conditioner; and
    wherein determining a compressor speed comprises utilizing the monitored temperature or relative humidity to determine the air conditioner's compressor speed.

3. The method of claim 1 wherein the request for operation includes a set point temperature, and wherein the determined compressor speed is less than the predetermined second speed, and further comprising reducing the set point temperature if an overcool mode selection has been received.

4. The method of claim 3 wherein reducing the set point temperature comprises reducing the set point temperature by approximately two degrees Fahrenheit.

5. The method of claim 1 wherein the request for operation comprises a set point temperature, and wherein the predetermined relative humidity value comprises approximately 60% relative humidity, and further comprising determining a relative humidity proximate an air conditioner.

6. The method of claim 1 wherein the predetermined first speed comprises approximately 90 percent of a maximum compressor speed, and wherein the predetermined second speed comprises a minimum compressor speed.

7. The method of claim 1 wherein the request for operation comprises a set point, and wherein the set point comprises at least one of a set point temperature or a set point relative humidity; and further comprising:
    monitoring at least one of a temperature or a relative humidity proximate the air conditioner;
    wherein determining a compressor speed for the compressor comprises selecting a compressor speed adapted to reduce at least one of the monitored temperature or the monitored relative humidity to the set point of the received request for operation.

8. An air conditioner comprising:
    a compressor comprising at least two speeds;
    an evaporator fan; and a controller configured to:
  receive a request for operation of the air conditioner;
  determine a compressor speed for a compressor of the air conditioner; and
  determine, based on the determined compressor speed, a mode of the air conditioner to allow, wherein determining a mode to allow comprises:
    allowing a cooling mode if the determined compressor speed is greater than a predetermined first speed;
    allowing the cooling mode and a dehumidifying mode if the determined compressor speed is less than the predetermined first speed and if the determined compressor speed is greater than a predetermined second speed; and
    allowing only the dehumidifying mode if the determined compressor speed is less than the predetermined second speed and a relative humidity is greater than a predetermined relative humidity value.

9. The air conditioner of claim 8 wherein the controller is further configured to allow the air conditioner to operate based at least partially on at least one of the modes determined to be allowed.

10. The air conditioner of claim 8 wherein the controller is further configured to:
  receive a request for an overcool mode;
  receive a request for operation comprising a set point temperature; and
  reduce the set point temperature by a predetermined value.

11. The air conditioner of claim 8 wherein the controller is further configured to:
  receive a request for an overcool mode;
  receive a request for operation comprising a set point temperature; and
  inhibit reduction of the set point temperature by a predetermined value if the cooling mode is allowed.

* * * * *